United States Patent [19]

Chevreux et al.

[11] 4,297,185

[45] Oct. 27, 1981

[54] PHOTOSETTING ADHESIVE FROM UNSATURATED OLIGOMER, PHOTOINITIATOR, AND BETAINE-FORMING MIXTURE OF UNSATURATED TERT.AMINE AND UNSATURATED ACID

[75] Inventors: Pierre Chevreux, St Jean De Gonv, France; Van-Tao Nguyen, Petit-Lancy, Switzerland; Alain Roman, Bossey, France; Daniel Turpin, Nyon, Switzerland

[73] Assignee: Techinter S.A., Geneva, Switzerland

[21] Appl. No.: 76,780

[22] Filed: Sep. 18, 1979

[30] Foreign Application Priority Data

Sep. 20, 1978 [CH] Switzerland ......................... 9815/78

[51] Int. Cl.$^3$ ...................... C08F 2/50; C08F 220/28; C08L 75/04; B32B 27/16
[52] U.S. Cl. ...................... 204/159.15; 204/159.19; 204/159.22; 204/159.23; 428/425.6; 48/423.7; 525/454; 525/920; 526/312; 528/71
[58] Field of Search ................... 525/920; 204/159.19, 204/159.15

[56] References Cited

U.S. PATENT DOCUMENTS

| | | | |
|---|---|---|---|
| 2,548,428 | 4/1951 | Fiedorek | 260/501.13 |
| 3,425,988 | 2/1969 | Gorman et al. | 260/31.2 N |
| 3,509,234 | 4/1970 | Burlant et al. | 525/126 |
| 3,671,502 | 6/1972 | Samour et al. | 526/75 |
| 4,133,909 | 1/1979 | Spencer | 204/159.15 |
| 4,139,436 | 2/1979 | Jasani | 204/159.16 |
| 4,237,253 | 12/1980 | Jacquet et al. | 526/923 |

FOREIGN PATENT DOCUMENTS

2281968 8/1974 France .
1430422 3/1976 United Kingdom .

OTHER PUBLICATIONS

Berner et al., "Recent Developments–", J. Oil Col. Chem. Assoc., 1978, 61, pp. 105–113.
Le Berre et al., Bulletin de la Societe Chemique 1973, #2, pp. 640–657, #7–8, 2404–2409.
Astle et al., "Organic Chemistry", Second Ed., 1959, Harper Bros., p. 298.

*Primary Examiner*—John C. Bleutge
*Assistant Examiner*—A. H. Koerkert
*Attorney, Agent, or Firm*—Curtis, Morris & Safford

[57] ABSTRACT

A photo-hardenable adhesive composition particularly suitable for use in the bonding of glass to other materials, especially plastics, as in the production of safety glass and armoured glass laminates and comprising (A) a photopolymerisable ester of an $\alpha,\beta$-ethylenically unsaturated acid and a hydroxylated urethane or urea and having a moleculare weight of 500 to 10,000
(B) a photoinitiator
(C) a substituted or unsubstituted aliphatic or cycloaliphatic N,N-dialkylamino alcohol ester of an $\alpha,\beta$-ethylenically unsaturated carboxylic acid, said alcohol having an alkylene moiety of up to six carbon atoms between hydroxy and the amino functions, and
(D) an $\alpha,\beta$-ethylenically unsaturated carboxylic acid in an amount equal to one mole per mole of C, (C) and (D) being capable of reacting together to form a betaine, and preferably
(E) at least one further copolymerisable monomer or oligomer and which may comprise an excess of (C) or (D) over equimolar.

16 Claims, No Drawings

PHOTOSETTING ADHESIVE FROM UNSATURATED OLIGOMER, PHOTOINITIATOR, AND BETAINE-FORMING MIXTURE OF UNSATURATED TERT.AMINE AND UNSATURATED ACID

The present invention relates to a photosetting adhesive composition which is hardenable by irradiation under u.v. light and which is particularly effective as an adhesive for glass, and to its application for the bonding of glass to glass or other substrates especially plastics, e.g. as in the manufacture of laminates such as safety-glass laminates for the construction of houses and other buildings (window-panes, glass-partitions, etc.) and armoured glass, and in the manufacture of insulated glass (double glazing).

According to the common techniques presently in use, laminated glass panels, e.g. the safety-glass laminates used in the construction of buildings, are manufactured by inserting a thin layer of clear thermoplastic material between two glass plates and, thereafter, heating the obtained assembly to cause the individual elements of the laminate to strongly stick together and to eliminate the air bubbles accidentally trapped therein. This technique is time consuming and expensive because, in addition to the time spent for heating, some more time must be allowed for the slow cooling of the pieces to prevent possible breakage due to thermal shock; further, this technique is not adapted to continuous production. Moreover, thermoplastic materials provided with a suitable refractive index which directly adhere to glass by melting or which can be glued thereto with known adhesives are not common and are expensive (e.g. polyvinylbutyral, polyurethanes, polycarbonates). Also, the use of classical adhesives is met with the same difficulties as already mentioned before because heat must ultimately be used for the hardening step (thermosetting adhesives). Further, at the time of use, the initial viscosity of such adhesives is already relatively high which makes them difficult to use as very thin layers and to completely eliminate air-bubbles and other internal defects trapped therein.

In order to correct the above deficiencies, novel adhesive compositions with photo-hardening properties have been developed recently. With such compositions, it is no longer necessary to use heat since the adhesive properties are developed by irradiation.

To be suitable for use in the production of glass laminates, the adhesive must of course be clear and colourless and have a refractive index like that of glass. For the production of safety glass or armoured glass laminates, the adhesive must also be capable of bonding not only to glass but also to plastics materials likely to be employed as interlayers in the production of the laminates, and it must be sufficiently strong and flexible to absorb the stresses and strains set up in the laminate during heating or cooling, due to the different coefficients of expansion of the glass and plastics materials employed in the laminate. It must also not noticeably discolour or lose its bonding strength on ageing.

Many photopolymerisable adhesive compositions have been proposed but none has been entirely satisfactory for the production of laminates containing both glass and plastics layers.

For example, French Pat. No. 2001985 describes a composition comprising an olefinically unsaturated ester prepolymer, an olefinically unsaturated monomer copolymerisable with the prepolymer and, of course, a photopolymerisation initiator. This composition, after introduction between two glass plates, provides after u.v. irradiation a strong and flexible bond. However, it employs as the prepolymer a polyester which is expensive to manufacture and its adhesion to some resins such as polyethylene and polypropylene is inadequate, thus precluding the use of these common plastics materials in the production of safety glasses.

French Patent Application No. 2347425 discloses a u.v. polymerisable composition based on a polyalkeneoxy derivative, polyglycol acrylates and optionally alkyl acrylates with long chain alkyl groups. These compositions after irradiation are said to provide excellent adhesion to a variety of substrates but they are not suggested to be suitable for the production of laminated glass panels and their adhesive strength to those plastics which are difficult to bond, e.g. polyethylene, is not disclosed.

French Patent Application No. 2281968 discloses u.v.-polymerisable adhesive compositions based on acrylic acid (II) and an N,N-dialkylaminoalkyl acrylate or methacrylate (I) and U.S. Pat. No. 3,671,502 discloses that the zwitter ion compounds (III) known as betaines and obtainable by the inter-reaction of these two compounds as indicated below (where the use of N,N-dimethylaminoethyl methacrylate as the ester is shown) may be copolymerised with hydroxyalkyl acrylates to give copolymers useful as adhesives for, e.g. glass, leather, plastics, steel, etc.

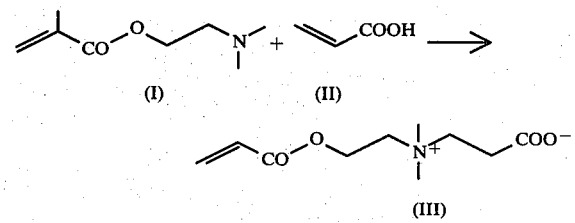

However, the adhesives described in both these publications are hydrophilic and, under moist conditions, their bond strength deteriorates with time, a condition which may lead to eventual separation of the elements bonded together. Moreover, the adhesives described in this French patent application tend to be rigid and to discolour on ageing.

Polymerisable compositions based on olefinically unsaturated oligomeric compounds which also contain urethane groups have been known for many years. In general, these are prepared by reacting a compound containing free isocyanate groups with an olefinically unsaturated compound containing a free hydroxyl group.

For example U.S. Pat. No. 3,425,988, published in 1969, describes a sealant composition comprising (a) a monomer obtained by reacting a hydroxyalkyl ester of acrylic or methacrylic acid with a polyisocyanate (which monomer is hereinafter referred to for convenience as a "urethane acrylate") and (b) a free radical polymerisation initiator of the peroxy type; U.S. Pat. No. 3,509,234 (1970) describes paint compositions that are curable by electromagnetic radiation and comprising a film-forming solution of a vinyl monomer and a "urethane acrylate"; and German Offenlegungsschrift (OLS) No. 2115373 (1971) describes a photopolymerisable composition suitable for use in the production of flexographic printing plates and comprising a photosensitiser, an ethylenically unsaturated monomer and a "urethane acrylate" obtained by reacting 2-hydroxyethyl methacrylate with the polyisocyanate obtained by reacting 2 moles of a diisocyanate with 1 mole of a polyethylene glycol.

German OLS No. 2324822 (1973) to Loctite (Ireland) Limited, and equivalent to BP No. 1430422, describes the use of a photopolymerisable composition based on the reaction product of a polyisocyanate with a polymerisable acrylate ester having a hydroxyl group or a primary or secondary amino group in the alcoholic moiety thereof, as an adhesive for laminating glass to glass. However, the polymeric products obtained by exposing these compositions to u.v. irradiation are described as hard and there is no indication that they bond adequately or at all to plastics substrates of the kind that would be of interest in the production of safety glass laminates or armoured glass. Moreover, BP Specification No. 1448257 (1976), also in the name of Loctite (Ireland) Limited, describes how after a flexible thermoplastics tape coated on one side with such a composition has been applied to a substrate and the composition polymerised in contact with the substrate by u.v. irradiation, the tape may be peeled away from the cured adhesive composition without difficulty, even in the absence of a release coating between the tape and the adhesive composition, to leave the cured composition as a coating on the substrate. It is apparent from this publication, therefore, that the polymerised composition cannot be expected to bond strongly to thermoplastic materials.

Since the publication of German OLS No. 2324822, there have been many publications, e.g. U.S. Pat. Nos. 3,862,021 and 4,018,851 and French Patent Publication No. 2303835, proposing modifications of these compositions, primarily by selection of the components forming the polyisocyanate and/or polymerisable acrylate ester.

The present invention provides an adhesive composition which reduces or overcomes most of the above-mentioned drawbacks. In particular, by means of the invention compositions may be obtained which on curing are glass clear and colourless and which bond strongly both to glass and to plastics materials, even those plastics materials which are difficult to bond such as polyethylene and polypropylene, and are sufficiently strong and flexible to withstand the strains and stresses that occur on heating or cooling glass/plastics laminates due to the different coefficients of expansion of glass and plastics.

According to the present invention, there is provided a photohardenable composition polymerisable by irradiation under u.v. light to provide an adhesive, and including:

A. at least one photopolymerisable prepolymer having an olefinic double bond activated by an electrophilic substituent, B. a polymerisation photoinitiator, C. a substituted or unsubstituted aliphatic or cycloaliphatic N,N-dialkylamino alcohol ester of an alpha, beta-ethylenically unsaturated carboxylic acid, said alcohol having an alkylene moiety of up to six carbon atoms between the hydroxy and the amino functions, and D. an alpha,beta-ethylenically unsaturated carboxylic acid in an amount of one mole per mole of C, and wherein (C) and (D) are capable of reacting together to form a betaine and said oligomer or prepolymer (A) is an ester of an alpha,beta-ethylenically unsaturated acid and a hydroxylated product containing one or more urethane and/or urea links in the molecule thereof and having a molecular weight from about 500 to 10,000.

As betains are ionic salts in character, it would have been expected that compositions containing both compounds capable of reacting together to form a betaine and an organic prepolymer such as (A) would form two phases and therefore the production of strong clear colourless adhesives from the compositions of the invention is most unexpected.

In fact, by means of the invention, compositions can be obtained having remarkable adhesive properties toward most usual substrates, namely glass, minerals, metals, wood and plastic materials and resins, and a surprising affinity for some substances well known to be difficult to be glued or cemented together without preliminary surface treatment, namely polypropylene (PP), polyethylene (PE), polycarbonates (PC), polymethylmethacrylates (PM) (Plexiglass, Lucite, etc.) and polyvinylchloride (PVC).

Thus, the invention also provides a method of bonding a face of a material that is transparent to u.v. radiation to another face of the same or different material by providing a layer of the composition between the faces and then subjecting said layer to u.v. irradiation to cure the composition and bond the faces together.

The invention is particularly applicable to the bonding of glass to glass or to other materials, especially plastics and more particularly the relatively cheap and readily available plastics listed above. Thus one particularly preferred aspect of the invention is the production of a clear laminate by bonding a sheet of glass to a transparent plastics lamina which may be, for example, a sheet of organic glass or a thin flexible transparent plastics film intended to be used as an interlayer between two glass sheets or between a sheet of glass and a sheet of organic glass. Thus, by means of the invention shock resistant glass laminates, especially safety glass and armoured glass, can be prepared from such plastics materials, which was impossible with the known adhesives of the prior art.

Another important aspect of the invention is in the bonding of glass to wood, wood products or metal, especially aluminium, e.g. the bonding of glass elements to frame members in the production of double glazing units of the kind known for thermal and/or sound insulation.

Yet another important aspect of the invention is in the bonding of one transparent plastic to another transparent plastic, e.g. in the bonding together of two sheets of organic glass, which may be formed of the same or different polymeric materials, e.g. polymethylmethacrylate and polycarbonate optionally with the interposition between the two sheets of a thin flexible transparent plastics film as, for example, in the production of some forms of armoured or bullet-proof glass.

Component A may be regarded as the product obtained by esterifying the alpha,beta-ethylenically unsaturated carboxylic acid with an oligomeric compound containing at least one free hydroxyl group and also at least one urethane and/or urea group. It may be formed, for example, by reacting an ester of the acid wherein the ester moiety contains at least one active hydrogen atom, preferably a hydroxyester, with an isocyanate containing at least one free isocyanate group. In the latter case, one or both of the isocyanate and the alcoholic moiety of the ester will be oligomeric.

Thus, in general terms, Component A may be regarded as being made up of three components; namely the acid, an hydroxy compound containing at least one other active hydrogen atom which e.g. may be part of a hydroxyl or an amine group, and an isocyanate compound containing one or more free isocyanate groups. One or both of the hydroxy compound and isocyanate compound may also contain olefinic unsaturation.

As the hydroxy compound may be employed, for example, diols, polyols, and compounds containing at least one hydroxy group and one or more amino hydrogen atoms, e.g. glycols, glycerols, polyalkyleneoxydiols, polyamine-glycols, diethanolamine, aminoethanol, hydroxyethyl-ethylenediamine, hydroxyethylhexamethylenediamine, etc. and mixtures thereof.

As the polyisocyanate may be employed, for example, toluene diisocyanates, 4,4'-diphenyl diisocyanate, 4,4'-diphenyl alkane diisocyanates, dianisidine diisocyanates, 1,5-naphthalene diisocyanate, 4,4'-diphenyl ether diisocyanate, p-phenylene diisocyanate, trimethylene diisocyanate, tetramethylene diisocyanate, hexamethylene diisocyanate, ethylene diisocyanate, cyclohexylene diisocyanates, nonamethylene diisocyanate, octodecamethylene diisocyanate, 2-chloropropane diisocyanate, 2,2'-diethylether diisocyanate, 2-(dimethylamino) pentane diisocyanate, tetrachlorophenylene-1,4-diisocyanate, 3-heptene diisocyanate and transvinylene diisocyanate.

If the isocyanate compound contains three or more isocyanate groups or the hydroxy compound contains three or more active hydrogens, branched products may be obtained, e.g. by reacting x molecules of an hydroxyester of the acid with one molecule of an isocyanate having x isocyanate groups where x is three or more. Such an isocyanate may be prepared for example by reacting x molecules of a diisocyanate with one molecule of a compound having x active hydrogen atoms, such as trimethylol propane, glycerol or pentaerythritol.

However, where a low viscosity adhesive composition is required, it is generally preferred that component A is substantially linear and derived from the acid, one or a mixture of hydroxy compounds containing an average about two (e.g. 1.8–2.2) active H atoms, and one or a mixture of isocyanates having on average about two (e.g. 1.8–2.2) isocyanate groups.

In a preferred form, component A is substantially linear and may be regarded as being made up of the acid, a diol component and a diisocyanate component.

For example, the acid may be reacted with the diol component in about 1:1 molar ratio to form an hydroxy ester of the acid which is then reacted in a 1-2:1 molar ratio with the diisocyanate component, or a diol may be reacted in a molar excess with a diisocyanate to give a dihydroxy-terminated urethane oligomer which is then reacted with up to two moles of the acid. Thus component A can be a mixture of linear compounds with an average level of olefinic unsaturation per molecule, due to the acid, of between 1 and 2.

Mixtures of acids, diols and/or isocyanates may be employed and one or both of the diol and isocyanate may itself be oligomeric to provide the necessary molecular weight in the product.

For example, where the diol is oligomeric, it may be a polyester-, polyether- or polyurethane-diol (e.g. obtained by reacting a low molecular weight diol with a diisocyanate in a molar ratio of in excess of 1 up to 2 moles of diol per mole of diisocyanate). Where the isocyanate is oligomeric, it may be a polyurethane, polyurea or a polymer containing both urethane and urea groups, and may be obtained, for example, by reacting a low molecular weight diisocyanate with a diol (which may be a polyether or polyester, for example) in a molar ratio of more than 1 mole up to 2 moles of diisocyanate per mole of diol.

Examples of preferred low molecular weight diols are ethylene glycol, propylene glycol, diethylene glycol, neopentyl glycol, bisphenol A, 1,4-dimethylolcyclohexane and butane-1,4-diol and examples of oligomeric diols are the dihydroxy terminated homopolymers and copolymers of ethylene oxide and propylene-1,2-oxide and the dihydroxy terminated polyesters and copolyesters of one or more of the above-mentioned low molecular weight diols with one or more dicarboxylic acids such as succinic acid, glutaric acid, adipic acid, pimelic acid, suberic acid, azelaic acid and sebacic acid.

Examples of preferred low molecular weight diisocyanates are alkylene diisocyanates such as hexamethylene diisocyanate and aromatic diisocyanates such as toluene diisocyanates, xylylene diisocyanates and bis-(isocyanatophenyl)compounds such as bis(4-isocyanatophenyl) methane and 2,2-bis(4-isocyanatophenyl) propane.

The acid is suitably a monocarboxylic acid such as acrylic acid or an alpha-substituted derivative thereof where the substituent is e.g. a lower alkyl group, halogen or cyano, e.g. as in methacrylic acid.

Component A has a molecular weight of 500 to 10,000 and preferably about 1000 to 5000. Particularly good clarity and the ability to adhere to a wide variety of plastics materials are obtained when component A is based on a flexible oligomeric polyol and an isocyanate in which the free isocyanate groups are not linked together by a long chain alkylene group whereby the isocyanate may be regarded as a substantially rigid molecule, e.g. as in cycloaliphatic and substantially aromatic isocyanates.

Preferably component A has one olefinically unsaturated group for each 800–3000 of molecular weight, on average.

The compounds A are therefore unsaturated esters of macromolecular hydroxy compounds comprising in their back-bone one or more urethane and/or urea bridges which result from the reaction of the —NCO groups of the isocyanates with the —OH or —NH$_2$ groups, respectively, of the e.g. polyols, polyamines or aminoalcohols. One is therefore dealing with polyurethane-polyurea olefinic monomer-oligomers many types of which are offered on the market under various registered or fancy names.

Component A preferably forms from 10 to 95% of the total weight of the composition.

Components C and D together preferably form 1 to 10% by weight of the total of the composition. Quantities higher than 10% may impart to the adhesive after polymerization some level of hydrophilicity which may be detrimental for certain applications, namely when the laminate manufactured with the present composition must ultimately be used under moist conditions.

On the other hand, if the combined weight of components C and D is below 1%, the activity of compounds (I) and (II) is less than within the above mentioned limits. However, in some special cases, it may become desirable to use amounts above 10% or below 1%, namely when it is desired to impart special properties to the present adhesive.

Components C and D preferably have the following formulae

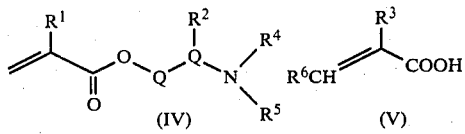

in which the Q—Q link represents a straight or cyclic hydrocarbon connecting group of up to 6 carbon atoms, $R^1$ to $R^3$ represent H or lower alkyl groups, $R^4$ and $R^5$ are lower alkyls and $R^6$ is H or a —$COOR^7$ group where $R^7$ is H or a lower alkyl (i.e. $C_1$–$C_4$ alkyl).

Component C may result from the esterification, by usual means, of a tertiary-amino-alcohol HO-Q-Q$R^2$-N$R^4R^5$ with an acrylic or substituted acrylic acid $CH_2$=$CR^1$—COOH. Typical examples of such amino-alcohols are, dimethylaminoethanol, N,N-dimethyl-2-aminopropanol, N,N-diethyl-aminoethanol, N,N-dimethyl-3-aminopropanol, N,N-diisopropyl-3-aminopropanol, N,N-dimethyl-3-aminobutanol, N,N-dimethyl-2-amino-3-butanol, N,N-dimethyl-4-aminobutanol, N,N-dimethyl-5-aminopentanol, N,N-dimethyl-4-aminocyclohexanol and N,N-dimethyl-2-aminocyclohexanol. Examples of acids are acrylic and methacrylic acids and other derivatives of such compounds, not expressly covered by the above formulae, e.g. halogenated and cyanosubstituted derivatives.

Component D is an alpha, beta-ethylenically unsaturated carboxylic acid such as acrylic acid, methacrylic acid, maleic acid, fumaric acid or the monoesters of these dicarboxylic acids.

It is also possible to use in the present composition, instead of the additives represented by formulae (C) and (D), the zwitter ion or betaine compound obtained by mixing these compounds together. There is evidence that these substances react one with the other on simple admixture because, after mixing stoichiometric quantities at room temperature, there is an evolution of heat. Practically, after leaving (C) with (D) to stand for a few hours, the desired quantity of the mixture is added to components A and B. Where the betaine is employed in place of the mixture of C and D, it may also be derived by other means, e.g. by the reaction described in U.S. Pat. No. 2,548,428. However, in general, because it is more economical, it is preferred to directly mix together all ingredients of the composition, that is components A, B, C and D optionally with other additives if desired, e.g. stabilizers, activators, etc. and leave the mixture to stand at room temperature for allowing the reaction between C and D to take place and, also, other possible reactions between C, D and the other olefinic monomers. Of course, no confusion should be made between the above-mentioned reaction and the subsequent photopolymerization reaction of the adhesive.

The present composition may also contain in addition to components A–D, at least one copolymerisable olefinically unsaturated compound, E, which may be monomeric or oligomeric in nature.

The range of olefinic monomers and oligomers suitable as component E in the present invention is wide. Indeed, most of the olefins which are in liquid form at room temperature and at least one of the double bonds of which is activated by a suitable substituent are convenient. Typical activator substituents for this double bond are the groups halogeno, keto, cyano, nitro, aryl, etc., when located in the α-position relative to said double bond.

It is to be understood that in the composition of the invention, component E may be provided in whole or in part by an excess of component C or, more preferably, component D over the equimolar proportion specified for these materials. In fact, in one preferred embodiment, compound E is satisfied at least in part by having component D present in an amount in excess of equimolar with component C, especially where D is acrylic acid.

Overall, where one or other of C or D is present in excess it is preferred that components C and D are present in molar ratios of from 2:1 to 1:100.

An exhaustive range of compounds which can be used as or in component E can be found in the above-quoted references and in the following ones: U.S. Pat. No. 3,759,807; J. C. MILEO, "Analyse de la litterature des brevets sur la formulation des liants radio-durcissables", Revue de l'Institut francais du petrole 31, (5), 823 (1076). As examples of preferred olefins, the following can be mentioned: acrylic, methacrylic, cyano-acrylic and chloroacrylic acids and esters of lower alkyl groups, polyol acrylates, cyanoethyl acrylate, trimethylol-propane triacrylate, acrylamides and corresponding derivatives, arylolefins such as styrene, allylbenzene, allyl phthalate, etc.

Oligomers and prepolymers of category E can be, for instance, hemi-esters resulting from the reaction of a polyol with about one equivalent of maleic anhydride per —OH equivalent of the polyol; oligo-amides and oligo-ester-amides of maleic anhydride obtained by the reaction thereof with, for example, di- or polyamines; lower molecular weight co-polymers of alkenyl acrylates and methacrylates with hydroxy-alkenyl compounds; esters of α-unsaturated fatty acids, etc.

It should be stressed that one of the further advantages of the invention resides in the multiple possible variations of the olefinic portion of the adhesive composition. Indeed, in contrast with the other adhesive products of the prior art, it is possible to use in the present composition, depending on the desired viscosity before photopolymerization, very simply structured olefinic monomers (such being therefore very free-flowing liquids) as well as relatively high molecular weight oligomers or prepolymers. Thus, it will be possible to control the formulation of the olefinic portion of the composition according to the needs and as a function of the starting viscosity desirable for any type of application.

Component E preferably forms from 0.001 to 60% of the total weight of the composition.

It should be noted that, in the case of the invention, the presence of the amino compound (C) or rather its reaction product with (D), appears to have an activating effect on the rate of the photopolymerization. This effect, which constitutes one further advantage of the invention, is very surprising because, although it is known that some amines can act, together with certain photoinitiators, as photopolymerization activators (see for instance M. R. SANDNER, C. L. OSBORN and D. J. TRECKER, Benzophenonetriethylamine Photoinitiated Polymerization of Methyl Acrylate, G. Pol. Sci. 10, 3174 (1972)), quaternary ammonium salts did not seem to have such properties.

In the present composition, it is possible to use, as photoinitiators B, most classical photopolymerization initiators. A useful list of such initiators can be found in U.S. Pat. No. 3,759,807. In the present invention, some of the preferred initiators are benzoin, acetophenone, anthraquinone, benzophenone and naphthophenone because of availability and price considerations. However this list is not exhaustive.

The quantity of such photoinitiator in the present composition can preferably range from about 0.001 to 10% by weight of the total composition. When the quantity of photoinitiator is below 0.001% by weight, the photopolymerization is generally too slow to be practical. Quantities above 10% are generally not required, are not advantageous economically and can have a detrimental effect on some properties of the adhesive.

For fabricating laminates, the present composition may be applied as follows: once the various ingredients have been mixed, and after a period for allowing the various possible reactions between the ingredients to come to equilibrium, the adhesive composition is applied to one or both facing sides of the substrates to be assembled together, then such substrates are brought together by superimposing one onto the other so as to eliminate, e.g. by application of pressure, all air-bubbles and other defects possibly present between said substrates; then, the assembly is irradiated by means of an adequate actinic source according to usual practice. Naturally, at least one of the substrates must be transparent to the photoradiation used. For this, one works in the ultra-violet spectrum at a wavelength appropriate for the photoinitiator employed and for a time sufficient to produce the polymerization of said composition.

By means of the invention it is possible to achieve very high values of adhesion of glass to a substrate such as plastic, wood or metal within very short irradiation periods (for instance from between 0.5 and 30 sec. to a few minutes, depending on the source power and on the wavelength). Adhesive values, measured according to the Standard Test called "T peel test" and described in ASTM D 1876-69 Standards, can attain 10–50 N/inch. These values are only temporarily lowered when the laminate is boiled with water or subjected to treatment with superheated steam (e.g. at 117° C.).

The adhesive layer can be applied at will on one or both of the facing sides of the elements to be glued together. This application can be carried out manually, for example by means of a brush or a pad soaked in the photopolymerizable composition, or by any suitable mechanical means.

The thickness of the adhesive layer, expressed in grams per unit surface area, can be between 0.1 and 20 g/m$^2$ or even exceed such limit. Best adhesion results, especially when the laminate is subjected to long exposures to moisture, are obtained when using about 5–10 g/m$^2$ of the adhesive.

The irradiation period required to achieve the polymerization of the adhesive is directly related to the time after which the minimum dose of radiation of proper wavelength has been absorbed by the adhesive layer. It therefore essentially depends on the spectral distribution of the source, on the power thereof, on the distance thereof from the substrate to be irradiated and on the optical transmission of that layer of the substrate which must be penetrated by the light before reaching the adhesive itself. Thus, glass and synthetic resins all have some significant extinction coefficient in the UV range and, consequently, the irradiation duration must be adapted to the optical properties of each material used.

As irradiation sources, any having an emission spectrum largely comprised above 0.3$\mu$ is convenient, e.g. mercury vapor lamps. One or more lamps of 20 W to about 10 KW can be used, e.g. a 2 kW lamp of type HTQ7 made by PHILIPS or a high-pressure mercury vapor lamp giving 80 W/cm made by HANOVIA. Argon or krypton lamps can also be used.

Preferably, the polymerization is carried out only by irradiation with no further heat than that resulting from the light sources. In general, it is not necessary that such heat be removed, e.g. by cooling. The present adhesive can be applied to the continuous or the discontinuous manufacture of laminates.

By means of the present invention, compositions may be obtained which are suitable for cementing most of the usual solid substrates: wood, metals, paper, glass, minerals, ceramics, plastics, etc. However, an important aspect of the invention is in the provision of adhesive compositions useful for the manufacture of glass-to-glass and, especially, plastics-to-glass laminates.

In particular, the invention enables a wide choice of transparent plastics having satisfactory optical properties for laminating with glass. Thus, by means of the invention inserts of polyethylene (PE), polypropylene (PP), polyvinyl chloride (PVC), polyurethane, polyester, polyamide, polycarbonate, polyacrylic resins (which term includes methacrylate resins), polyvinylbutyral, etc., may be employed using very economical operating conditions since the compositions can be provided in a form which is easy-flowing before polymerization and which can therefore be worked easily and the air bubbles being possibly trapped between the layers of the laminate cab be squeezed away by the application of only slight pressures. Moreover, by means of the invention, compositions can be provided which are particularly suited for semi-continuous working operations since irradiation takes only a few seconds or minutes and no slow heating or cooling of the glass is required.

It must be emphasised that the present adhesive is particularly valuable for the production of laminates which comprise organic glass elements instead of the usual corresponding mineral glass plates. Using hard pieces of transparent synthetic resins in place of glass for the manufacture of safety and shock-proof clear laminates is a modern technique aimed at producing lighter although very resistant materials which are more convenient to handle and will save building labor costs. Such hard transparent plates can be made available from resins such as polymethacrylates, hard PVC, polycarbonates, polyurethane, etc., which cannot be assembled by usual means or by using usual adhesives. Thus, for instance, if composite glass laminates comprising such an organic glass plate, e.g. a polycarbonate plate, sandwiched between two glass plates are assembled together by inserting PVB intermediate sheets and heat treating, the organic-glass element will be damaged by heat. On the other hand, if assembly of the glass plates to the organic glass plate is achieved by using conventional adhesives, the bonding strength is inadequate or the relatively low flexibility of the adhesive will not be sufficient to accomodate the difference in thermal expansion between the mineral and organic glasses and loss of bonding and optical properties will result with time.

For the above reasons, another valuable use of the invention is in the bonding of plastics to plastics, the plastics being the same or different.

The reasons why the present adhesive adheres so well to relatively inert polymers such as polyethylene are not known but it is supposed that, during irradiation there may occur a certain degree of grafting between the polymer chains of the substrate and that of the adhesive. Whatever will happen exactly, it is not rare to achieve with adhesives of the present invention bonding strengths between the substrates in the order of 1000–2000 N/cm$^2$ and peel strengths of 10–50 N/inch.

It must be noted that the present adhesive composition can also be used for the manufacture of glass laminates without any plastic insert between the glass elements, e.g. by providing a suitable gap between the glass slabs by means of braces or cross-bars, such gap being filled up with the adhesive composition. After irradiation and hardening, the present adhesive thus replaces the usual plastic inserts, which condition is quite possible in view of the excellent flexibility and resistance to mechanical and thermal shocks even at relatively high thicknesses of the polymerized adhesive (e.g. film inserts are about 0.5–1 mm whereas ordinary cementing layers of adhesive may be about 20–200$\mu$ thick).

In summary, adhesive compositions may be obtained according to the invention having the following remarkable properties:

1. A combination of a hydrophobicity sufficient for articles fabricated using the adhesive to withstand exposure to humidity and rain for an extended period, with the ability to adhere strongly to hydrophilic surfaces such as of glass and other similar materials.
2. Excellent adhesion towards such diverse plastics materials as PVC, PE, PP, PM (Plexiglass, Lucite), polycarbonates (PC), polyurethanes (PU) and other synthetic resins.
3. Excellent clarity and lack of colour and a refractive index compatible with that of glass.
4. The ability when employed to produce laminates between sheets, plates or foils having different coefficients of thermal expansion, e.g. glass and plastics, to withstand considerable variations in temperature without rupture or other damage caused by the stresses set up due to differing expansion or contaction of the individual elements of the laminate.
5. Good ageing characteristics.
6. The ability of safety and armoured glass laminates prepared using the adhesive to successfully withstand mechanical and thermal shocks and extended vibration stresses. In this connection, it should be noted that in the absence of compound A in the composition, the adhesive can under the influence of prolonged vibration undergo slow degradation and eventually lose its transparency and bonding properties.
7. The ability by suitable choice of the chemical constitution, molecular weight and concentration of the compound A, to minimise the volatility of the composition before irradiation and thus toxicity hazards, ventilation problems, fire hazards, etc., and to adjust the viscosity of the composition before irradiation within wide limits. This last factor is important because, in the manufacture of laminates, a device for assembling the flat elements thereof can include small diameter pipes for flowing the fluid adhesive composition to the substrates to be glued together and thin nose-tips for distributing said liquid on the surfaces thereof. Thus, the flow resistance of the fluid in such parts and therefore the pressures must be kept within acceptable limits compatible with sufficient flow-rates, low energy take-up and mechanical strength of said device.

Advantages procured by the present invention over the state of the prior art in the field of laminated glass are the following:

The possibility of carrying out quick and semi-continuous work, e.g. with bands of glass resulting from continuous production (float-glass) and with inserts provided from plastic sheet rolls.

The elimination of problems inherent to the drying of old adhesives by evaporation of the mixing solvents and of the optical faults related to the bubbles caused by such evaporation.

The cancelling of the steps consisting in heating the laminates to effect adhesion in special ovens working discontinuously and in cooling the glass very slowly to avoid thermal shock.

The use of an adhesive of low initial viscosity and flowing more freely because it is in the unpolymerized state; therefore, the possibility of using only a very small amount thereof with equal or better cementing strength, wherefrom great economy of material and strong reduction of the hazards connected with the manipulation of acrylic monomers will be achieved.

A saving of energy since no heat is required and the irradiation time is short.

The safety glass laminates obtained by applying the composition of the invention are also part of the present invention, namely the high mechanical strength glass laminates comprising, in addition to the glass elements, elements made of "organic glass" that is, for instance, polyurethane and polycarbonate plates, with intermediate flexible transparent plastics films such as of PVB, PVC or soft polyurethane.

The following Examples illustrate the invention in more detail.

EXAMPLE 1

In a laboratory polymerization flask, there were mixed mechanically 930 g of EBECRYL 220 (a prepolymer based on acrylic acid, an aliphatic unsaturated polyester and an aromatic isocyanate and having a molecular weight Mn of about 1000, containing about 11 meq/g of olefinic unsaturation and marketed by UCB, Belgium) as component A, 40 g of benzophenone, 7.3 g (0.1 mole) of acrylic acid (D) and 15.7 g (0.1 mole) of dimethylaminoethyl methacrylate (C) (DMAEMA). There was thus obtained a photopolymerizable composition.

This composition was evenly deposited on one side of each of two glass plates (50×50 cm; "float-glass" type) 4 mm thick, then the two plates were joined and pressed together (pressure 0.4 N/cm$^2$) so as to obtain, between them, a liquid adhesive phase of 0.1–0.2 mm. The assembly was irradiated 5 min by means of a mercury-vapor lamp, Type HTQ7, 2kW, 28 W/cm (obtained from the Deutsche Philips GMBH) placed at 15 cm distance. After irradiation a sample was cut from the laminate (2.5×2 5 cm square) and subjected to a pulling resistance test according to the American Standard Test ASTM D-1344-57 (1965). For this, there was attached on each side of the square a device for applying a force tending to pull apart the two bonded elements thereof, this force being directed normally to the square surfaces of the sample. Then the sample was subjected to such forces by means of an INSTRON testing apparatus and it was recorded that the resistance to separation was 1500 N/cm$^2$.

EXAMPLE 2

Adhesive compositions labelled (C), (D) and (E) were prepared as described in Example 1 with the following ingredients: (C) UVITHANE 782 (a prepolymer based on acrylic acid, a saturated aliphatic polyester and an aromatic isocyanate and having a molecular weight Mn of about 5300 and about 0.4 meq/g of olefinic unsaturation and marketed by Thiokol Corpn), 920 g, benzophenone 40 g, DMAEMA 27.4 g (0.175 mole), acrylic acid 12.6 g (0.175 mole).

(D) UVITHANE 782 100 g, trimethylpropane triacrylate 820 g, benzophenone 40 g, DMAEMA 27.4 g acrylic acid 12.6 g.

(E) UVITHANE 782 150 g, cyanoethyl acrylate 770 g, benzophenone 40 g, DMAEMA 27.4 g, acrylic acid 12.6 g.

Besides, there were prepared control samples, respectively (F), (G) and (H), with the same ingredients and the same quantities, except the DMAEMA and the acrylic acid that were omitted.

Laminate samples were prepared as described in Example 1 with each of the six above adhesive compositions and, after polymerization under identical conditions, samples were taken and subjected to the same separation resistance tests. The results are recorded in Table I below.

TABLE I

| Sample | Resistance to separation (N/cm$^2$) |
| --- | --- |
| C | 1700 |
| F (Comparative) | 500 |
| D | 770 |
| G (Comparative) | 540 |
| E | 1160 |
| H (Comparative) | 670 |

This Example shows the considerable importance on the adhesive properties of the present compositions after irradiation of the presence of the DMAEMA and acrylic acid.

The Example also shows that using a large proportion of a lower molecular weight olefinic monomer (to beneficiate from a low initial viscosity) causes no inconvenience.

EXAMPLE 3

The following adhesive mixture (% by weight) was prepared:
EBECRYL 230 ( a prepolymer based on an aliphatic polyether, an aliphatic isocyanate and acrylic acid and having a molecular weight Mn of about 5000 and about 0.2 meq/g of olefinic unsaturation and marketed by UCB, Belgium): 31%
Acrylic acid: 62%
DMAEMA: 2.5%
Benzophenone: 2.5%
Lauroylperoxide: 2%
(about 1.1% of the acrylic acid provides component C and the balance is component E).

This mixture was used to attach together two glass plates as described in Example 1 and two samples (I) and (J) of such laminate before irradiation were prepared. The first sample (I) was irradiated for 5 min as described in Example 1, whereas sample (J) was heated 1 hr at 110° C. after which it was allowed to slowly cool down (3 hrs).

The separation resistance of the two laminates was measured as described in Example 1 and gave the following results: (I) 1650 N/cm$^2$; (J) 1750 N/cm$^2$. It can be seen from this experiment how much operational time can be saved by using light instead of heat for effecting the polymerization, the properties of the hardened compositions being about equal in both cases.

EXAMPLE 4

A composition (K) was made by mixing the following ingredients (% by weight):
UVITHANE 782: 45.5%
Acrylic acid: 45.5%
DMAEMA: 4%
Benzophenone: 5%
(about 1.8% of the acrylic acid provides component C and the balance is component E).

A control composition (L) was prepared with the same proportion of the same ingredients but replacing the UVITHANE by acrylic acid; i.e. bringing the acrylic acid level to 91% by weight.

A glass plate (50×50 cm) 4 mm thick (float-glass) was carefully degreased with a commercial detergent solution then it was rinsed with water and methanol and dried. A layer of composition (K) (30 g/m$^2$) was applied to the plate after which there was deposited on the adhesive layer a polyvinylbutyral sheet (PVB) and air bubbles were pushed away by pressing slightly which was very easy because the solution was so free-flowing. The PVB sheet, Type TROSIFOL 30, was 0.76 mm thick and was provided by DYNAMIT NOBEL, Germany.

A similar laminate was prepared with control composition (L) and both laminates were irradiated as described in Example 1.

The laminates were thereafter subjected to the peel test according to ASTM standards. For this samples 1 inch wide were cut from the laminates and the force applied in parallel to the plate which was just necessary to peel off the bonded film was measured. The results were as follows: Sample K1 (from the laminate prepared with composition (K) 30-35 N/inch; Sample L1 (from the laminate prepared with (L) 35-40 N/inch.

Thereafter, the main laminates were completed as follows: a new layer of adhesive was applied to the PVP side thereof and a second glass plate was adhered to said coated side thus producing, after irradiation, two new laminates, respectively K2 and L2 prepared, respectively, with compositions (K) and (L) above.

The resistances to separation by traction were then measured on cuttings from laminates K2 and L2 and were found to be 1350 N/cm$^2$ and 1530 N/cm$^2$, respectively. Then, the laminates were immersed in boiling water and subjected for 6 hrs to vibrations (3000 Hz) from a vibration generator. After that period, the tests were repeated and it was noted that K2 had remained unchanged while L2 had lost its transparency and its mechanical strength was strongly decreased. This test thus evidences the utility of the olefin prepolymer with urethane functions as a component of the present adhesive composition.

EXAMPLE 5

The following adhesive compositions were prepared as follows (% by weight):

M.
  UVITHANE 782: 31.5%
  Acrylic acid: 63.5%
  DMAEMA: 2.5%
  Benzophenone: 2.5%
(about 1.1% of the acrylic acid provides component C and the balance is component E)

O.
  UVITHANE: 48%
  Acrylic acid: 48%
  DMAEMA: 2%
  Benzophenone: 2%
(about 0.9% of the acrylic acid provides component C and the balance is component E).

By using the adhesive compositions (K from the previous Example, (M) and (O) above, there were prepared, according to the technique illustrated at Example 4, a series of laminates of the glass-plastic-glass type. The nature of the insert plastic sheets is specified in Table II below. During this preparation, the peel resistance (ASTM) and the separation resistance were successively as described in the previous Examples. The samples studied and the test results are recorded in Table II.

EXAMPLE 6

An aluminium sheet 40μ thick was heated 12 hrs at 145° C., then after cooling it was coated at the rate of 6 g/m² with composition M of the previous Example. Then a 50μ thick polyethylene HP sheet was applied to the coated side of the aluminium sheet and the composite was photopolymerized 10-15 sec by the means described in Example 1. The peeling strength of the obtained composite was measured according to the description of Example 4 and found to be 30 N/inch. In fact, the adhesion was so strong that the sheets tended to give up before they got separated. This Example evidenced the surprising adhesion developed, after polymerization, by the present adhesive toward very inert polymers such as PE. In a similar manner aluminium can be bonded to a glass sheet.

EXAMPLE 7

A test similar to that of the previous Example was performed using a 40μ polyamide sheet, a 50μ PE sheet and, as the adhesive, a composition containing (by weight) UVITHANE 782 44%, acrylic acid 44%, (4.5% as component C and the balance as component E), DMAEMA 10% and benzophenone 2%. After irradiation, the peel resistance was 30 N/inch which showed that using an excess of DMAEMA (above about 5%) did not bring any particular improvement in the adhesion.

TABLE II

| Adhesive composition of the laminate | Insert sheet, kind of plastic | Kind of glass | Peel test (N/inch) | Separation test traction force (N/cm²) |
|---|---|---|---|---|
| K | PVC soft, 1mm | Float, 4mm | 75-80 | — |
| K | Polyurethane, (PLATILON 401) | " | 67-70 | — |
| M | Polyurethane, (PLATILON 401) | " | 45-60 | 1,100 |
| K | PVB (TROSIFOL 30mil) | Polycarbonate (MAKROLON standard) | 75-80 | 940 |
| M | PVB (TROSIFOL 30mil) | Polycarbonate (MAKROLON standard) | 50-55 | — |
| O | PVB (TROSIFOL 30mil) | Polycarbonate (MAKROLON standard) | 55-60 | 740 |
| K | PVC soft 1mm | Polycarbonate (MAKROLON standard) | 70-75 | — |
| M | " | Polycarbonate (MAKROLON standard) | 60-65 | — |
| O | " | Polycarbonate (MAKROLON standard) | 70-75 | — |
| O | Polycarbonate (MAKROLON standard) | Float, 4mm | 70-75 | 810 |
| K | PVC soft 1mm | PVC hard (TAKIRON) | 70-75 | — |
| M | " | PVC hard (TAKIRON) | 60-65 | — |
| O | " | PVC hard (TAKIRON) | 70-75 | — |
| K | " | PMM (PERSPEX) | 27-30 | — |
| K | " | PMM (CELLIDOR) | 55-60 | — |

This Example shows that glass laminates with a wide variety of plastic inserts can be prepared by means of the present adhesive all having acceptable to good physical properties.

EXAMPLE 8

Three adhesive compositions, respectively (P), (Q) and (R) were prepared by means of the following ingredients (parts by weight)

| Composition | UVI-THANE 782 | Acrylic Acid | DMAEMA | Benzophenone | Viscosity (cps at 22° C.) |
|---|---|---|---|---|---|
| P | 25 | 50 | 2 | 2 | 140 |
| Q | 50 | 50 | 2 | 2 | 750 |
| R | 75 | 50 | 2 | 2 | 4350 |

(About 0.9 parts of the acrylic acid were provided as component C and the balance of 49.1 parts is present as component E).

The above compositions were used to prepare a series of laminates (a) to (g), with mineral and organic glass, the structure of which is given in the scheme below, by stacking and gluing together glass and plastic plates separated by film inserts. The intermediate films were usually 0.76 mm thick whereas the plates themselves (glass or organic glass) were usually 4 mm thick. In the following Table thickness of the elements is given in mm; further PC=polycarbonate; PVP=polyvinylbutyral; PVC=polyvinyl chloride.

(a) glass (4)-PVB(0.76)-glass (4)
(b) glass (4)-PVC(0.76)-glass (4)
(c) glass (4)-PVB(0.76)-PC(MAKROLON,4)
(d) glass (4)-PVB(0.76)-glass(4)-PVB(0.76)-glass(4)
(e) glass (4)-PVB(0.76)-PC(MAKROLON,4)-PVB(0.76)-glass(4)
(f) glass (4)-PVC(0.76)-glass(4)-PVC(0.76)-glass(4)
(g) glass (4)-PVC(0.76)-PC(MAKROLON,4)-PVC(0.76)-glass(4)

After hardening by irradiation as described in the previous Examples, the laminates were allowed to age for a few days after which they were subjected to shock resistance tests as follows:

I. Dynastat Test (impact resistance I.R.): In this test a strip sample of the laminate (about 30×50 mm) is gripped in a vice, with part (about 25 mm) sticking out vertically therefrom. This protruding part is subjected to a blow from a hammering pendulum having a given amplitude and being placed so as to hit the sample transversally at the lower dead point of its swinging course, i.e. at the maximum kinetic energy. The energy absorbed by the rupture of the sample slows down the pendulum, the displacement of which on the other side of the break point will be shortened accordingly. The exact point reached by the pendulum is recorded by a check-pointer driven by the pendulum in relationship to a scale directly calibrated in work units (N cm) whereby the magnitude of the resistance of the sample can be read directly.

II. Resistance to the impact from a steel ball (C.R.) In this test a steel ball (2.08 kg) is dropped (height 3 m) in the centre of a laminate (60×60 cm) placed horizontally on a square frame. The operation is repeated until the ball digs a hole in the laminate and passes therethrough. The number of blows required is then recorded as a measure of resistance to shock.

The results recorded on the different laminates (a) to (g) above and labelled, depending on the adhesive (P), (Q) or (R) used, as (a)P, (a)Q, (a)R, etc. are given in Table III below. The same measurements carried out on the two following commercial laminates (prepared by conventional techniques, that is by fusion of the inserts) are also given in Table III.

Laminate (1) glass(4)-PVB(0.76)-glass (4)
Laminate (2) glass(2.4)-PVB(0.76)-glass(2.4)

TABLE III

| | Impact resistance of a series of laminates | | |
|---|---|---|---|
| Example | Resistance to separation N/cm² | I.R. (N cm) | C.R. (number of blows) |
| (a)P | 1200 | 50 | — |
| (a)Q | 1280 | 74 | 5 |
| (a)R | 900 | 93 | — |
| (b)P | — | 100 | — |
| (b)Q | — | 110 | 10 |
| (b)R | — | 62 | — |
| (c)P | 860 | 920 | — |
| (c)R | — | 1030 | — |
| (c)Q | — | 1010 | — |
| (d)P | — | 183 | — |
| (d)Q | — | 249 | — |
| (d)R | — | 334 | — |
| (e)P | — | 1170 | — |
| (e)Q | — | 1220 | — |
| (e)R | — | 1110 | — |
| (f)R | — | 340 | — |
| (g)p | — | 854 | — |
| (g)Q | — | 1200 | — |
| (g)R | — | 980 | — |
| Laminate 1 | — | — | 5 |
| Laminate 2 | — | — | 4 |

The I.R. Values above show that a marked increase in impact resistance is obtained when replacing one of the glass layers by a polycarbonate plate. They also show the advantages of the PVC over the PVB as insert sheets, which advantage could not be implemented before the present invention for lack of a suitable adhesive.

EXAMPLE 9

Glass laminates were prepared using two 4 mm thick glass plates separated by PVB sheets (0.76 mm) and bonded by adhesive compositions (20μ). The first laminate used the adhesive described in Example 1 whereas laminate (2) was made with a control adhesive of the following composition (parts by weight).

Acrylic acid: 44%
Acrylamide: 29%
DMAEMA: 14%
Benzophenone: 3%

After 2 min irradiation as described in Example 1, both laminates were placed outdoors under full sunlight exposure. After a month standing, sample (1) showed no sign of change whereas sample (2) had discolored badly (yellowing).

EXAMPLE 10

Glass laminates were prepared using two 2 mm glass plates bonded on each side of a 4 mm polycarbonate plate with a 100μ layer of adhesive and without using any intermediate film sheet. The adhesives used were (1) the adhesive (K) of Example 4 and (2) the control adhesive of Example 9, respectively. After irradiation as a result of which the laminates were heated to about 70° C., there was obtained a perfectly clear laminate from adhesive (1) whereas the laminate made with control adhesive (2) cracked on cooling due to the inability of the cured adhesive to sustain the forces resulting from the differences in contraction between glass and polycarbonate.

EXAMPLE 11

Three groups, respectively, S, T and U, each of three adhesive compositions were prepared using in each 50 parts by weight of acrylic acid (0.9 parts as component C and the balance as component E), 2 parts DMAEMA, 2 parts benzophenone and variable quantities (according to Table IV below) of UVITHANE 783, UVITHANE 788 and EBECRYL 210 respectively. The Uvithanes are marketed by Thiokol Corporation and Ebecryl 210 is marketed by UCB, Belgium.

Uvithane 783 is based on acrylic acid, aliphatic polyester and aromatic isocyanate, has a molecular weight Mn of about 1200 and about 2 meq/g of olefinic unsaturation.

Uvithane 788 is based on acrylic acid, aliphatic polyester and aliphatic isocyanate, has a molecular weight Mn of about 1350 and about 1.4 meq/g of olefinic unsaturation.

Ebecryl 210 is based on acrylic acid, aliphatic polyester and aromatic isocyanate and has a molecular weight Mn of about 1500 and about 1.0 meq/g of olefinic unsaturation.

Samples of laminates comprising either a 0.76 mm polyurethane film (PLASTILON) or a 1 mm flexible PVC film bonded to glass were prepared according to the techniques described in the previous Examples. On each sample, after 1 month ageing, the peeling strengths were measured as described in Example 4. The results are shown in Table IV.

TABLE IV

| Sample | Polyurethane prepolymer (parts by weight) | Peeling strength (N/inch) | Film |
|---|---|---|---|
| S1 | UVITHANE 783 (25) | 75–80 | |
| S2 | UVITHANE 783 (50) | 30–40 | PLASTILON |
| S3 | UVITHANE 783 (75) | 60–65 | |
| T1 | UVITHANE 788 (25) | 20–25 | |
| T2 | UVITHANE 788 (50) | 28–33 | PVC |
| T3 | UVITHANE 788 (75) | 50 | |
| U1 | EBECRYL 210 (25) | 60–65 | |
| U2 | EBECRYL 210 (50) | 50–55 | PLASTILON |
| U3 | EBECRYL 210 (75) | 30–35 | |

EXAMPLE 12

Composition Q of Example 8 was used to bond a polypropylene film (0.2 mm) to plates of glass and of polycarbonate (MAKROLON). The peeling strength after irradiation was 30 N/inch in the case of glass whereas in the case of polycarbonate it could not be measured since the film broke before peeling off.

We claim:

1. A photohardenable composition polymerizable by irradiation under u.v. light to provide an adhesive and including:
   (A) at least one olefinic photopolymerizable prepolymer having an olefinic double bond activated by an electrophilic substituent, and
   (B) a polymerization photoinitiator, characterised in that the composition also includes
   (C) a substituted or unsubstituted aliphatic or cycloaliphatic N,N-dialkylamino alcohol ester of an $\alpha,\beta$-ethylenically unsaturated carboxylic acid, said alcohol having an alkylene moiety of up to six carbon atoms between the hydroxy and the amino functions, and
   (D) an $\alpha,\beta$-ethylenically unsaturated carboxylic acid in an amount equal to one mole per mole of C, (C) and (D) being capable of reacting together to form a betaine, and said oligomer or prepolymer (A) is an ester of an $\alpha,\beta$-ethylenically unsaturated acid and a hydroxylated product containing urethane and/or urea links in the molecule thereof and having a molecular weight from about 500 to 10,000.

2. The composition of claim 1, characterised in that compounds (C) and (D) have the following formulae

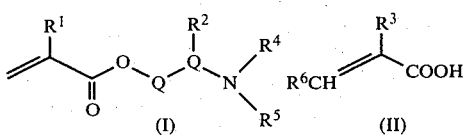

wherein the Q-Q link represents a straight or cyclic hydrocarbon connecting group of up to six carbon atoms, $R^1$ to $R^3$ represent H or lower alkyl groups, $R^4$ and $R^5$ are lower alkyls and $R^6$ is H or a $-COOR^7$ group where $R^7$ is H or lower alkyl.

3. The composition of claim 1 characterised in that compound A has the structure of the product of reacting an isocyanate compound containing at least one isocyanate group and an ester of an $\alpha,\beta$-ethylenically unsaturated carboxylic acid the ester moiety of which has at least one active hydrogen atom, or is an ester of said acid and an oligomeric compound containing at least one free hydroxy group and at least one urethane or urea group.

4. The composition of claim 3, characterised in that the compound A has the structure of an ester of said acid and a hydroxylated product resulting from a condensation between an active hydrogen-containing compound selected from diols, polyols, and compounds containing at least one hydroxy group and one or more amino hydrogen atoms and an isocyanate compound selected from toluene diisocyanates, 4,4'-diphenyl diisocyanate, 4,4'-diphenyl alkane diisocyanates, dianisidine diisocyanates, 1,5-naphthalene diisocyanate, 4,4'-diphenyl ether diisocyanate, p-phenylene diisocyanate, trimethylene diisocyanate, tetramethylene diisocyanate, hexamethylene diisocyanate, ethylene, diisocyanate, cyclohexylene diisocyanates, nonamethylene diisocyanate, octa-decamethylene diisocyanate, 2-chloropropane diisocyanate, 2,2'-diethyl-ether diisocyanate, 2'-(dimethylamino) pentane diisocyanate, tetrachlorophenylene-1,4-diisocyanate, 3-heptene diisocyanate and transvinylene diisocyanate and other polyisocyanates which are the higher molecular weight polyisocyanates obtained by reacting polyamides containing terminal primary or secondary amine groups, or polyhydric alcohols, with an excess of any of the above named diisocyanates.

5. The composition of claim 3 characterised in that component A is a substantially linear product derived from the $\alpha,\beta$-ethylenically unsaturated acid, at least one diol and at least one isocyanate having up to 2 isocyanate groups.

6. The composition of claim 5 characterised in that the diol is oligomeric and flexible and the isocyanate is a substantially rigid diisocyanate molecule.

7. The composition of claim 3, in which the acid is acrylic acid or an alpha-substituted derivative of acrylic acid.

8. The composition of claim 3 characterised in that component A has one olefinic unsaturation due to the acid per 800 to 3000 of molecular weight, in average.

9. The composition of claim 1 characterised in that it further includes at least one copolymerisable monomer or oligomer E.

10. The composition of claim 9 characterised in that compound E is provided at least in part by an excess of component C or D over the equimolar amount.

11. The composition of claim 10 characterised in that component D is acrylic acid which is present in an excess of the equimolar amount so as to also contribute to component E.

12. The composition of claim 10 wherein component C is present in an amount up to 2 moles per mole of D or D is present in an amount up to 100 moles per mole of C.

13. The composition of claim 9 characterised in that the concentrations by weight of the ingredients are A 10-95%; B 0.001-10%; C plus D 1-10%; E 0.001-60%.

14. The composition of claim 13 characterised in that compound E is selected from acrylic and methacrylic acid, the alkyl and cyanoalkyl esters thereof, the esters thereof with polyols and acrylic polyesters.

15. The composition of claim 1 characterised in that compound C is dimethylaminoethyl methacrylate and compound D is acrylic acid.

16. A modification of the composition claimed in claim 1 wherein the equimolar amount of components C and D are replaced by a betaine obtainable by reaction of a component C with a component D.

* * * * *

UNITED STATES PATENT AND TRADEMARK OFFICE
CERTIFICATE OF CORRECTION

PATENT NO. : 4,297,185
DATED : October 27, 1981
INVENTOR(S) : Pierre Chevreux et al.

It is certified that error appears in the above—identified patent and that said Letters Patent is hereby corrected as shown below:

Title page, after "Assignee:" delete "Techinter S.A., Geneva Switzerland" and insert --Deltaglass S.A., Geneva Switzerland--.

Claim 4, line 54, replace "polyamides" by --polyamines--.

Signed and Sealed this

Sixth Day of April 1982

[SEAL]

Attest:

GERALD J. MOSSINGHOFF

Attesting Officer — Commissioner of Patents and Trademarks